US009049151B2

(12) United States Patent
Ding et al.

(10) Patent No.: US 9,049,151 B2
(45) Date of Patent: *Jun. 2, 2015

(54) LOW-POWER POLICY FOR PORT

(71) Applicant: Broadcom Corporation, Irvine, CA (US)

(72) Inventors: Jin Ding, San Jose, CA (US); Bruce Kwan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/886,039

(22) Filed: May 2, 2013

(65) Prior Publication Data
US 2013/0243007 A1 Sep. 19, 2013

Related U.S. Application Data

(63) Continuation of application No. 12/611,717, filed on Nov. 3, 2009, now Pat. No. 8,456,992.

(60) Provisional application No. 61/249,484, filed on Oct. 7, 2009.

(51) Int. Cl.
*H04L 12/869* (2013.01)
*H04L 12/26* (2006.01)
*G06F 1/32* (2006.01)
*H04L 12/861* (2013.01)
*H04L 12/12* (2006.01)

(52) U.S. Cl.
CPC ............... *H04L 47/58* (2013.01); *H04L 12/12* (2013.01); *H04L 43/0888* (2013.01); *H04L 43/16* (2013.01); *G06F 1/3206* (2013.01); *G06F 1/325* (2013.01); *G06F 1/3287* (2013.01); *H04L 49/90* (2013.01); *Y02B 60/1282* (2013.01)

(58) Field of Classification Search
None
See application file for complete search history.

(56) References Cited

U.S. PATENT DOCUMENTS

| | | | |
|---|---|---|---|
| 5,319,638 | A | 6/1994 | Lin |
| 6,959,404 | B2 | 10/2005 | Hirakawa et al. |
| 7,830,882 | B2 | 11/2010 | Johnson |
| 8,107,365 | B2 | 1/2012 | Barrass |

(Continued)

FOREIGN PATENT DOCUMENTS

GB 2 389 022 A 11/2003

OTHER PUBLICATIONS

Office Action received for U.S. Appl. No. 12/611,717, mailed on Jun. 13, 2013, 24 pages.

(Continued)

*Primary Examiner* — Faruk Hamza
*Assistant Examiner* — Cassandra Decker
(74) *Attorney, Agent, or Firm* — McDermott Will & Emery LLP

(57) ABSTRACT

Various example embodiments are disclosed. According to an example embodiment, a method may include determining, by a port processor, a buffer length based on an amount of data stored in a port controlled by the port processor, comparing the buffer length to a low-power buffer threshold, determining a link utilization based on a number of packets transmitted by the port, comparing the link utilization to a link utilization threshold, and placing the port into a low-power state based on the comparison of the buffer length to the low-power buffer threshold and the comparison of the link utilization to the link utilization threshold.

20 Claims, 6 Drawing Sheets

(56) References Cited

U.S. PATENT DOCUMENTS

| | | | |
|---|---|---|---|
| 2002/0120830 A1 | 8/2002 | Matsuo | |
| 2004/0264396 A1 | 12/2004 | Ginzburg et al. | |
| 2005/0276275 A1 | 12/2005 | Sabry et al. | |
| 2005/0286430 A1 | 12/2005 | Koga et al. | |
| 2006/0083254 A1 | 4/2006 | Ge et al. | |
| 2009/0077401 A1* | 3/2009 | Tsai | 713/320 |
| 2009/0119524 A1 | 5/2009 | Hays | |
| 2009/0263127 A1 | 10/2009 | Haran et al. | |
| 2010/0061245 A1* | 3/2010 | Larsen | 370/237 |
| 2010/0103955 A1 | 4/2010 | Biederman et al. | |
| 2010/0131781 A1* | 5/2010 | Memon et al. | 713/310 |
| 2010/0262848 A1 | 10/2010 | Bobrek et al. | |
| 2011/0080919 A1 | 4/2011 | Ding et al. | |

OTHER PUBLICATIONS

Office Action received for U.S. Appl. No. 12/611,717, mailed on Nov. 20, 2012, 28 pages.

Notice of Allowance received for U.S. Appl. No. 12/611,717, mailed Feb. 7, 2013, 13 pages.

Office Action Response filed for U.S. Appl. No. 12/611,717, filed Sep. 7, 2012, 16 pages.

Office Action Response filed for U.S. Appl. No. 12/611,717, filed Jan. 14, 2013, 18 pages.

"P802.3az: IEEE Standard for Information Technology—Telecommunications and Information Exchange Between Systems—Local and Metropolitan Area Networks", Ethernet Working Group, IEEE Computer Society Local and Metropolitan Area Networks (C/LM), 2007, 4 pages.

"802.3az: Part 3: Carrier Sense Multiple Access with Collision Detection (CSMA/CD) Access Method and Physical Layer Specifications", IEEE Standard for Information Technology, Telecommunications and information exchange between systems—Specific requirements, Corrigendum 2: IEEE Std 802.an™—2006 10GBASE-T Correction, Aug. 17, 2007, 2 pages.

\* cited by examiner

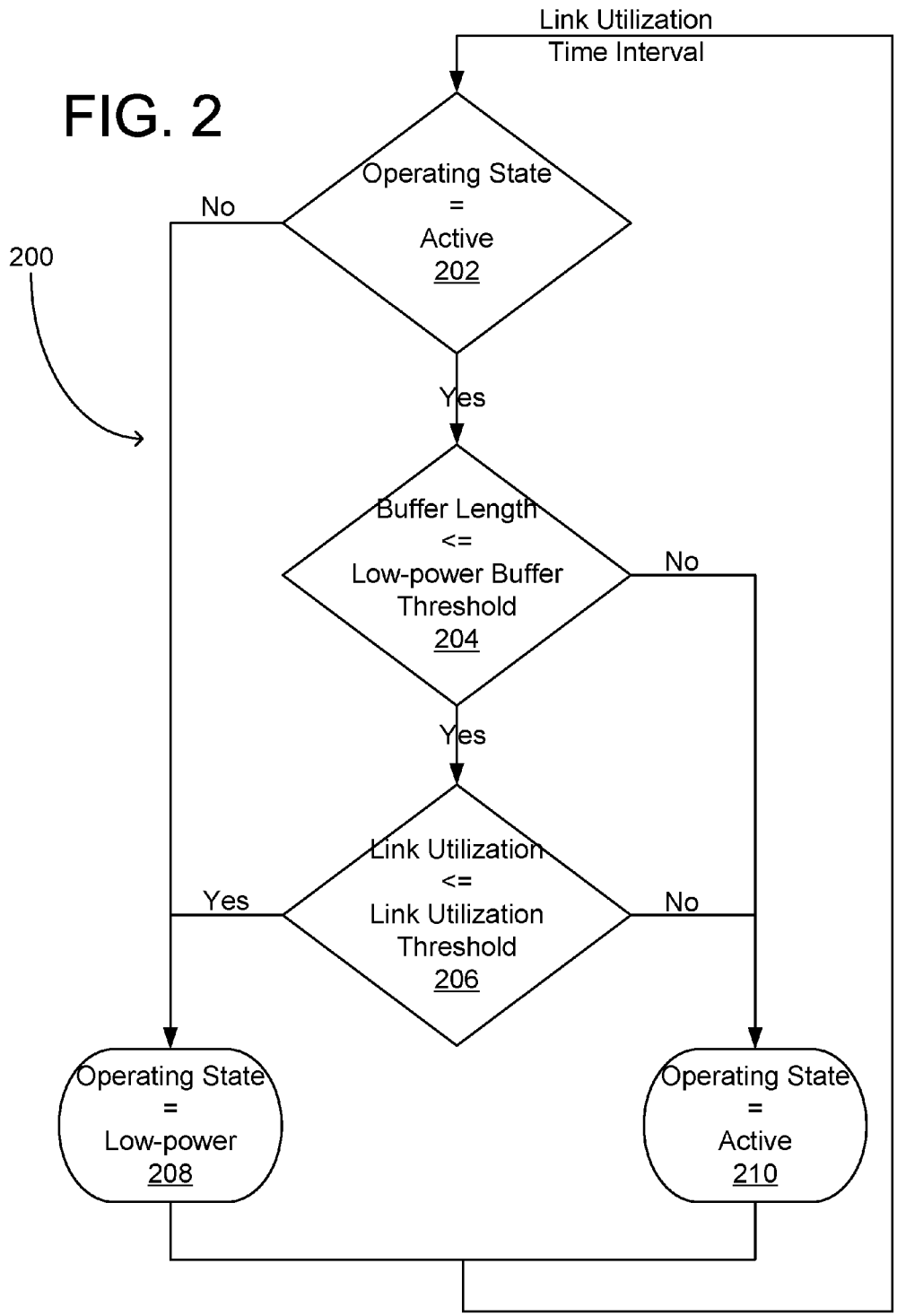

LOW-POWER POLICY FOR PORT

PRIORITY CLAIM

This application claim the benefit of priority based on U.S. patent application Ser. No. 12/611,717, filed on Nov. 3, 2009, entitled "LOW-POWER POLICY FOR PORT", which claims the benefit of priority based on U.S. Provisional Patent Application No. 61/249,484, filed on Oct. 7, 2009, entitled, "Low-Power Policy for Port," the disclosure of which is hereby incorporated by reference.

TECHNICAL FIELD

This description relates to packet switching.

BACKGROUND

Switches or routers may receive packets and send the packets out of ports. The ports may consume power when they are not transmitting packets.

SUMMARY

The details of one or more implementations are set forth in the accompanying drawings and the description below. Other features will be apparent from the description and drawings, and from the claims.

BRIEF DESCRIPTION OF THE DRAWINGS

FIG. 2 is a flowchart of an algorithm according to an example embodiment.

DETAILED DESCRIPTION

Figure 1A:
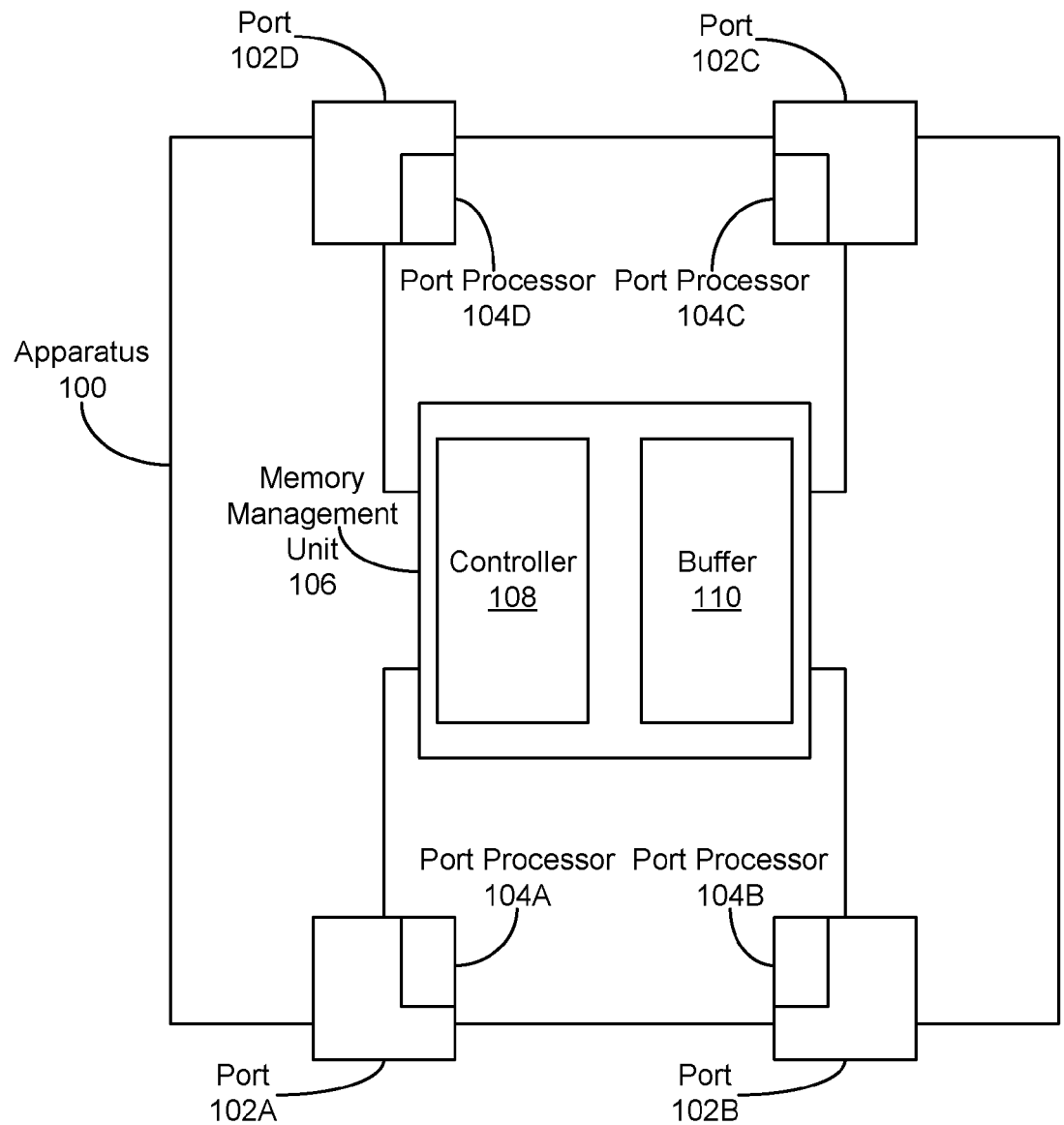
FIG. 1A is a block diagram of an apparatus for receiving and transmitting packets according to an example embodiment.

FIG. 1A is a block diagram of an apparatus for receiving and transmitting packets according to an example embodiment. The apparatus 100 may include, for example, a router or switch. The apparatus 100 may receive packets and transmit the packets toward their destinations. While the term, "packets," is used herein, "packets" may refer to packets, frames, datagrams, or any other representation of data readable by a computer or processor.

The apparatus 100 may operate according to any networking protocol, such as, but not limited to, IEEE 802.3 Ethernet and/or IEEE 802.3az Energy Efficient Ethernet, Internet Protocol, IEEE 802.11 Wireless Local Area Network, or IEEE 802.16 Worldwide Interoperability for Microwave Access.

The apparatus 100 may transmit and/or receive the packets via any number of ports 102A, 102B, 102C, 102D. While four ports 102A, 102B, 102C, 102D are shown in FIG. 1A, the apparatus 100 may include any number of ports 102A, 102B, 102C, 102D. In an example embodiment, some of the ports 102A, 102B, 102C, 102D may be ingress ports which receive packets, while other ports 102A, 102B, 102C, 102D may be egress ports which transmit packets. In an example embodiment, some or all of the ports 102A, 102B, 102C, 102D may be capable of both receiving and transmitting packets.

At times, the ports 102A, 102B, 102C, 102D may have no data or packets to transmit. The ports 102A, 102B, 102C, 102D may waste power by remaining in an active state when they are not transmitting packets. The ports 102A, 102B, 102C, 102D may conserve power by entering a low-power or low power idle (LPI) state when the ports 102A, 102B, 102C, 102D have no packets to transmit. The ports 102A, 102B, 102C, 102D may receive, transmit, and/or exchange data at a full and/or highest capacity or rate when in the active state, and may turn off some of their circuitry and/or components and cease transmitting packets when in a low-power state. The ports 102A, 102B, 102C, 102D may remain in the low-power state for as long as possible to save energy, according to an example embodiment. However, once any of the ports 102A, 102B, 102C, 102D have data or packets to transmit, they should exit the low-power state and/or enter the active state as quickly as possible to minimize adverse effects, such as traffic burstiness, delay, and/or delay jitter. When in the active state, and/or after exiting the low-power state, the ports 102A, 102B, 102C, 102D may be considered in a normal mode, and may exchange data at their full rates.

One or more of the ports 102A, 102B, 102C, 102D may include and/or be coupled to a port processor 104A, 104B, 104C, 104D. The port processors 104A, 104B, 104C, 104D may control whether their respective ports 102A, 102B, 102C, 102D are in the active state or the low-power state based, for example on a number of packets or amount of data queued for their respective ports 102A, 102B, 102C, 102D, and/or based on a number of packets transmitted by their respective ports 102A, 102B, 102C, 102D over a predefined time interval.

In an example embodiment, one or more of the port processors 104A, 104B, 104C, 104D may determine a buffer length for its respective port 102A, 102B, 102C, 102D. The buffer length may be based, for example on a number of packets or amount of data stored in the port 102A, 102B, 102C, 102D, such as in a buffer included in the port 102A, 102B, 102C, 102D. The buffer length may also be based on a number of packets or amount of data stored for the port 102A, 102B, 102C, 102D in a memory management unit 106.

The apparatus 100 may include the memory management unit 106. The memory management unit 106 may receive packets from the ports 102A, 102B, 102C, 102D, process the packets, store the packets, and/or send the packets to the appropriate port 102A, 102B, 102C, 102D. The memory management unit 106 may send the packets to their appropriate ports 102A, 102B, 102C, 102D based, for example, on destination addresses included in the packets.

In an example embodiment, the memory management unit 106 may include a controller 108. The controller 108 may control the flow of packets through the memory management unit 106, may determine where to store packets in the memory management unit 106, and/or may provide address mapping between the memory in the ports 102A, 102B, 102C, 102D and memory in the memory management unit 106.

The memory management unit 106 may include a buffer 110. The buffer 110 may be allocated to the ports 102A, 102B, 102C, 102D based on current needs of the ports 102A, 102B, 102C, 102D. The allocation of the buffer 110 may be updated and/or changed based on changing memory needs of the ports 102A, 102B, 102C, 102D. The buffer 110 may include a single shared memory which is shared by the ports 102A, 102B, 102C, 102D, may include dedicated memories for one or more of the ports 102A, 102B, 102C, 102D, or may include a combination of shared memory and dedicated memory. In an example buffer 110 which includes dedicated memory (either instead of or supplemental to the shared memory), each of the dedicated memories may be used to store packets and/or data only for its respective port 102A, 102B, 102C, 102D. The buffer length for a port 102A, 102B, 102C, 102D may be based on the number of packets and/or data stored for the port 102A, 102B, 102C, 102D in the port's buffer, and or in the buffer 110 allocated to the respective port.

As part of a determination of whether to place its respective port 102A, 102B, 102C, 102D into the low-power state, the port processor 104A, 104B, 104C, 104D may compare the buffer length of its respective port 102A, 102B, 102C, 102D to a low-power buffer threshold. The low-power buffer threshold may be stored in the port processor 104A, 104B, 104C, 104D and/or in the memory management unit 106. The low-power buffer threshold may be zero, or may be any other number which indicates that the buffer length is sufficiently low that placing the port 102A, 102B, 102C, 102D into the low-power state may delay sufficiently few packets and/or data to make the power savings resulting from the port 102A, 102B, 102C, 102D entering the low-power state a beneficial tradeoff. Each of the port processors 104A, 104B, 104C, 104D may use the same low-power buffer threshold, or the port processors 104A, 104B, 104C, 104D may use different low-power buffer thresholds, according to example embodiments. The low-power buffer threshold may be programmable, allowing a user or operator to update and/or determine the low-power buffer threshold, according to an example embodiment. The comparison of the buffer length to the low-power buffer threshold may provide a result indicating whether the port processor 104A, 104B, 104C, 104D should place its respective port 102A, 102B, 102C, 102D into the low-power state depending on the link utilization of the port 102A, 102B, 102C, 102D, according to an example embodiment.

One or more of the port processors 104A, 104B, 104C, 104D may also determine a link utilization of its respective port 102A, 102B, 102C, 102D. The link utilization may be based on a number of packets transmitted by the respective port 102A, 102B, 102C, 102D, such as over a link utilization time interval. The number of packets transmitted may include packets transmitted out of the apparatus 100 by the respective port 102A, 102B, 102C, 102D, according to an example embodiment.

The port processor 104A, 104B, 104C, 104D may update the link utilization based, for example, on a link utilization signal(s) received from its respective port 102A, 102B, 102C, 102D. The port 102A, 102B, 102C, 102D may, for example provide the link utilization signal to its respective port processor 104A, 104B, 104C, 104D upon transmission of each packet or group of packets, and the port processor 104A, 104B, 104C, 104D may increment the link utilization based on each received link utilization signal.

The port processor 104A, 104B, 104C, 104D may determine the link utilization over a link utilization time interval. The port processor 104A, 104B, 104C, 104D may, for example, decrement a link utilization timer. The port processor 104A, 104B, 104C, 104D may decrement the link utilization timer in response to each clock cycle, for example. The link utilization timer may expire at the end of the link utilization time interval. At the expiration of the link utilization time interval, the port processor 104A, 104B, 104C, 104D may store link utilization as the link utilization over the link utilization time interval. The port processor 104A, 104B, 104C, 104D may also restore the link utilization timer to the link utilization time interval, and begin decrementing the link utilization timer again to determine the link utilization over the next link utilization time interval.

After determining the link utilization, and/or upon expiration of the link utilization time interval, the port processor 104A, 104B, 104C, 104D may compare the link utilization to a link utilization threshold. The link utilization threshold may be stored in the port processor 104A, 104B, 104C, 104D and/or in the memory management unit 106. Each port processor 104A, 104B, 104C, 104D may have the same link utilization threshold, or the port processors 104A, 104B, 104C, 104D may have different link utilization thresholds, according to example embodiments. The link utilization threshold may be programmable, allowing a user or operator to update and/or determine the link utilization threshold, according to an example embodiment.

The port processor 104A, 104B, 104C, 104D may place its respective port 102A, 102B, 102C, 102D into the low-power state based on the comparison of the buffer length to the low-power buffer threshold and the comparison of the link utilization to the link utilization threshold. For example, the port processor 104A, 104B, 104C, 104D may place its respective port 102A, 102B, 102C, 102D into the low-power state based on the buffer length being less than, or less than or equal to, the low-power buffer threshold, indicating that sufficiently few packets or data are queued for transmission by the port 102A, 102B, 102C, 102D, and based on the link utilization being less than the link utilization threshold, indicating that the port 102A, 102B, 102C, 102D has recently been transmitting few packets or data. While in the low-power state, the port 102A, 102B, 102C, 102D may cease transmission of packets.

The port processor 104A, 104B, 104C, 104D may also remove its respective port 102A, 102B, 102C, 102D from the low-power state, allowing the port 102A, 102B, 102C, 102D to resume transmission of packets, based on the buffer length. For example, the port processor 104A, 104B, 104C, 104D may compare the buffer length to an active buffer threshold, and remove the port 102A, 102B, 102C, 102D from the low-power state based on the comparison of the buffer length to the active buffer threshold. In an example embodiment, the port processor 104A, 104B, 104C, 104D may perform the comparison of the buffer length to the active buffer threshold in response to its respective port 102A, 102B, 102C, 102D receiving a packet. The port processor 104A, 104B, 104C, 104D may remove the port 102A, 102B, 102C, 102D from the low-power state based on the buffer length being greater than, or equal to or greater than, the active buffer threshold.

The active buffer threshold may be a value for the buffer length which represents a number of packets or amount of data which should not be stored by the port 102A, 102B, 102C, 102D without entering the active state and beginning transmission of the packets. Thus, the port processor 104A, 104B, 104C, 104D may not let the buffer length exceed the active buffer threshold without removing the port 102A, 102B, 102C, 102D from the low-power state and/or placing the port 102A, 102B, 102C, 102D into the active state. The active threshold may be the same for each port processor 104A, 104B, 104C, 104D, or the port processors 104A, 104B, 104C, 104D may have different active buffer thresholds, according to example embodiments. The active buffer threshold may be programmable, allowing a user or operator to update and/or determine the active buffer threshold, according to an example embodiment.

The port processor 104A, 104B, 104C, 104D may also remove its respective port 102A, 102B, 102C, 102D from the low-power state and/or place its respective port 102A, 102B, 102C, 102D into the active state based on the port 102A, 102B, 102C, 102D storing packets at the expiration of an aging timer. The port processor 104A, 104B, 104C, 104D may, for example, maintain an aging timer. The port processor 104A, 104B, 104C, 104D may decrement the aging timer, such as at each clock cycle. The aging timer may be considered to expire when the aging timer reaches an aging timer floor, which may be zero. Upon expiration of the aging timer, the port processor 104A, 104B, 104C, 104D may compare the buffer length to a timer expiration buffer threshold. The timer expiration buffer threshold may be a number of packets which the port 102A, 102B, 102C, 102D may be allowed to store and remain in the low-power state after expiration of the aging timer. The timer expiration buffer threshold will typically be less than the active buffer threshold, resulting in the port processor 104A, 104B, 104C, 104D having a lower tolerance for leaving its respective port 102A, 102B, 102C, 102D in the low-power state upon expiration of the aging timer than before the aging timer expires. The timer expiration buffer threshold may, for example, be zero, resulting in the port processor 104A, 104B, 104C, 104D placing its respective port 102A, 102B, 102C, 102D into the active state upon expiration of the aging timer if the buffer length is non-zero, and/or if the port is storing any packets or data.

Figure 1B:
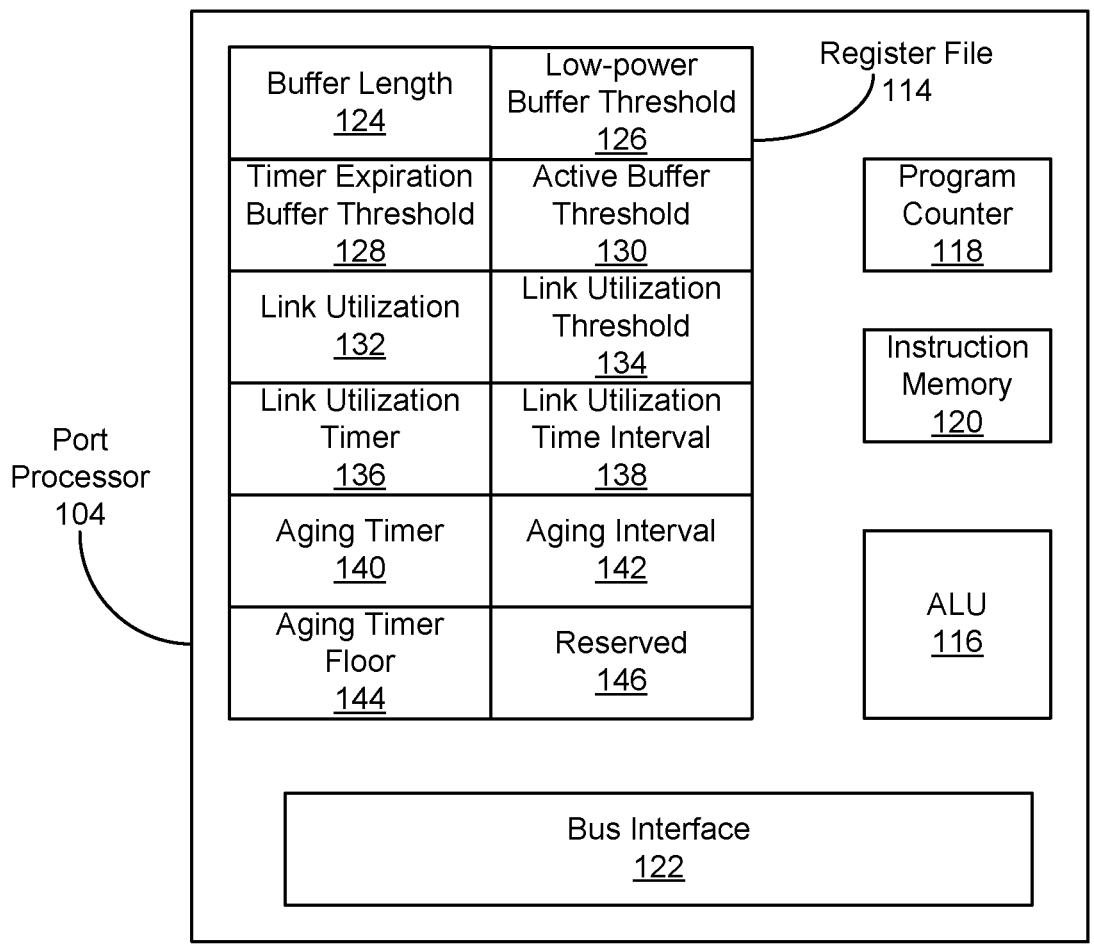
FIG. 1B is a block diagram of a port processor according to an example embodiment.

FIG. 1B is a block diagram of a port processor 104 according to an example embodiment. As discussed above, the port processor 104 may be coupled to and/or included in a port 102, and may control whether the port 102 is in the active power state and able to transmit packets, or in the low-power state and not able to transmit packets.

The port processor 104 may include a register file 114. The register file 114 may store any of the values described above, such the buffer length, the low-power buffer threshold, the timer expiration buffer threshold, the active buffer threshold, the link utilization, the link utilization threshold, the link utilization timer, the link utilization timer interval, the aging timer, the aging interval, and/or the aging timer floor.

The port processor 104 may also include an arithmetic/logical unit (ALU) 116. The ALU 116 may perform any of the increments, decrements, additions, subtractions, updates, or restorations to the values describes above. The ALU 116 may also perform any of the comparisons described above, and may provide output signals, such as to place the port 102 in, or remove the port 102 from, the low-power state.

The port processor 104 may also include a program counter (PC) 118 and instruction memory 120. The instruction memory 120 may include instructions for performing any of the tasks or functions described above. The program counter 118 may store, or point to, an address of a current instruction in the instruction memory 120. The program counter 118 may be incremented upon the reading or execution of each instruction, causing the port processor 104 to execute the next instruction stored in the instruction memory 120. The address stored in the program counter 118 may be changed based on instructions stored in the instruction memory 120, allowing the port processor 104 to execute loops and/or jumps within the instructions stored in the instruction memory 120, according to an example embodiment.

The port processor 104 may also include a bus interface 122. The bus interface 122 may carry information back and forth between the port processor 104 and other components in the apparatus 100, such as the port processor's respective port 102, and/or the memory management unit 106.

The register file 114 may include a number of registers. While twelve registers are shown in the example register file 114 shown in FIG. 1B, the register file 114 may include any number of registers, such as eight, sixteen, thirty-two, or sixty-four.

The register file 114 may, for example, include a buffer length register 124. The buffer length register 124 may store the buffer length; the port processor 104 may update the buffer length register 124 in response to receiving a buffer length signal from the port 102.

The register file 114 may also include a low-power buffer threshold register 126 which stores the low-power buffer threshold, a timer expiration buffer threshold register 128 which stores the timer expiration buffer threshold, and/or an active buffer threshold register 130 which stores the active buffer threshold. The values stored in low-power buffer threshold register 126, timer expiration buffer threshold register 128, and/or active buffer threshold register 130 may be programmed or set by a user or operator.

The ALU 116 may compare the value stored in the buffer length register 124 to the value stored in the low-power buffer threshold register 126, the timer expiration buffer threshold register 128, or the active buffer threshold register 130, to determine whether to place the port 102 into the low-power state or the active state, as described above.

The register file 114 may also include a link utilization register 132 which stores the link utilization. The port processor 104, such as by using the ALU 116, may update and/or increment the link utilization register 132 based on the associated port 102 transmitting packets. The register file 114 may also include a link utilization threshold register 134 which stores the link utilization threshold. The value stored in the link utilization threshold register 134 may be programmed or set by a user or operator. The ALU 116 may compare the value stored in the link utilization register 132 to the link utilization threshold register 134, in conjunction with comparing the value stored in the buffer length register 124 to the low-power buffer threshold 126, to determine whether to place the port 104 in the low-power state, according to an example embodiment.

The register file 114 may also include a link utilization timer register 136. the link utilization timer register 136 may be used to manage a timer interval over which the link utilization is measured. The register file 114 may, for example, include a link utilization time interval register 138. The link utilization timer interval register 138 may be set or programmed by a user or operator, and may determine the interval over which the link utilization is measured. The link utilization timer register 136 may initially be set to the value stored in the link utilization timer interval register 138. The port processor 104 may decrement the link utilization timer register 136, such as in response to a clock cycle. Upon expiration of the link utilization timer register 136, the ALU 116 may compare the value stored in the link utilization register 132 to the value stored in the link utilization threshold register 134, to determine whether the link utilization is at or below the link utilization threshold. As described above, the processor 104 may place the port 102 into the low-power state based on the comparison of the link utilization to the link utilization threshold, in conjunction with the comparison of the buffer length to the low-power buffer threshold.

The register file 114 may also include an aging timer register 140. The aging timer register 140 may serve as the aging timer to determine when to compare the buffer length to the timer expiration buffer threshold. The register file 114 may include an aging interval register 142. Aging interval register 142 may determine a time for the aging interval, and may be set or programmed by a user or operator of the apparatus 100. The aging timer register 140 may, for example, be initially set to the value stored in the aging interval register 142. The aging timer may be triggered, and/or the aging timer register 140 may be decremented, when the port 102 is in a low-power state, according to an example embodiment. The port processor 104 and/or ALU 116 may decrement the aging timer 140, such as at each clock cycle. The register file 114 may include an aging timer floor register 144. The aging timer floor register 144 may include a value at which the aging timer will be considered to have expired. The aging timer floor register 144 may be set or programmed by a user or operator of the apparatus. The aging timer floor register 144 may be set to zero; alternatively, a zero register may be used instead of the aging timer floor register 144.

When the value of the aging timer register 140 is equal to the value stored in the aging timer floor register 144 or the zero register, the aging timer may be considered to have expired. At the expiration of the aging timer, the ALU 116 may compare the value stored in the buffer length register 124 to the value stored in the timer expiration buffer threshold register 128. If the value stored in the buffer length register 124 is greater than, or greater than or equal to, the value stored in the timer expiration buffer threshold register 128, the port processor 104 may place the port 102 in the active state. Upon expiration of the aging timer, the port processor 104 and/or ALU 116 may also restore the value in the aging interval register 142 to the aging timer register 140, such as by copying the value stored in the aging interval register 142 into the aging timer register 140, according to an example embodiment.

The register file 114 may also include one or more reserved registers 146. The reserved register(s) 146 may be unused, or may include a zero register and/or pointer registers, such as stack pointers, frame pointers, or global pointers, according to example embodiments.

FIG. 2 is a flowchart of an algorithm 200 according to an example embodiment. In this example, at the expiration of the link utilization timer, and/or at each link utilization time interval, the port processor 104 may determine whether the operating state of its associate port 102 is active (202). If the operating state of the port 102 is not active, then port processor 104 may allow the port 102 to remain in the low-power state (208). If the operating state of the port 102 is active, then the port processor 104 may determine whether the buffer length is less than or equal to the low-power buffer threshold (204). If the buffer length is greater than the low-power threshold, then the port processor 104 may allow the port 102 to remain in the active state (210). If the buffer length is less than or equal to the low-power buffer threshold, then the port processor 104 may determine whether the link utilization is less than or equal to the link utilization threshold (206). If the link utilization is greater than the link utilization threshold, then the port processor 104 may allow the port 102 to remain in the active state (210). If the link utilization is less than or equal to the link utilization threshold, then the port processor 104 may place the port 102 into the low-power state (208).

Figure 3:
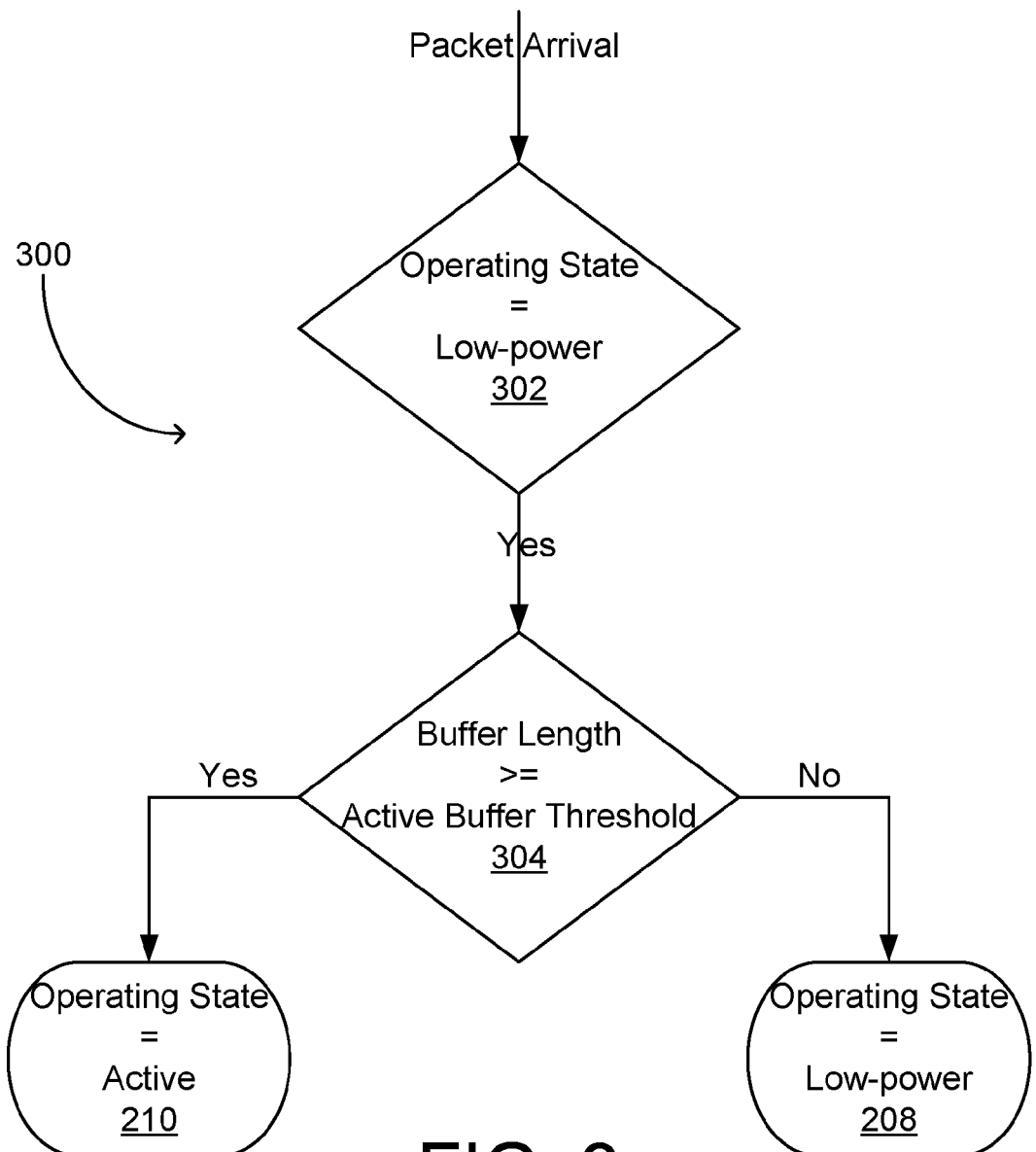
FIG. 3 is a flowchart of an algorithm according to another example embodiment.

FIG. 3 is a flowchart of an algorithm 300 according to another example embodiment. The port processor 104 may perform this algorithm 300 in response to a packet arriving at the port 102 when the port is in the low-power state (302). The port processor 104 may determine whether the buffer length is greater than or equal to the active buffer threshold (304). If the buffer length is less than the active buffer threshold, then the port processor 104 may allow the port 102 to remain in the low-power state (208). If the buffer length is greater than or equal to the active buffer threshold, then the port processor 104 may remove the port 102 from the low-power state, and/or place the port 102 into the active state (210).

Figure 4:
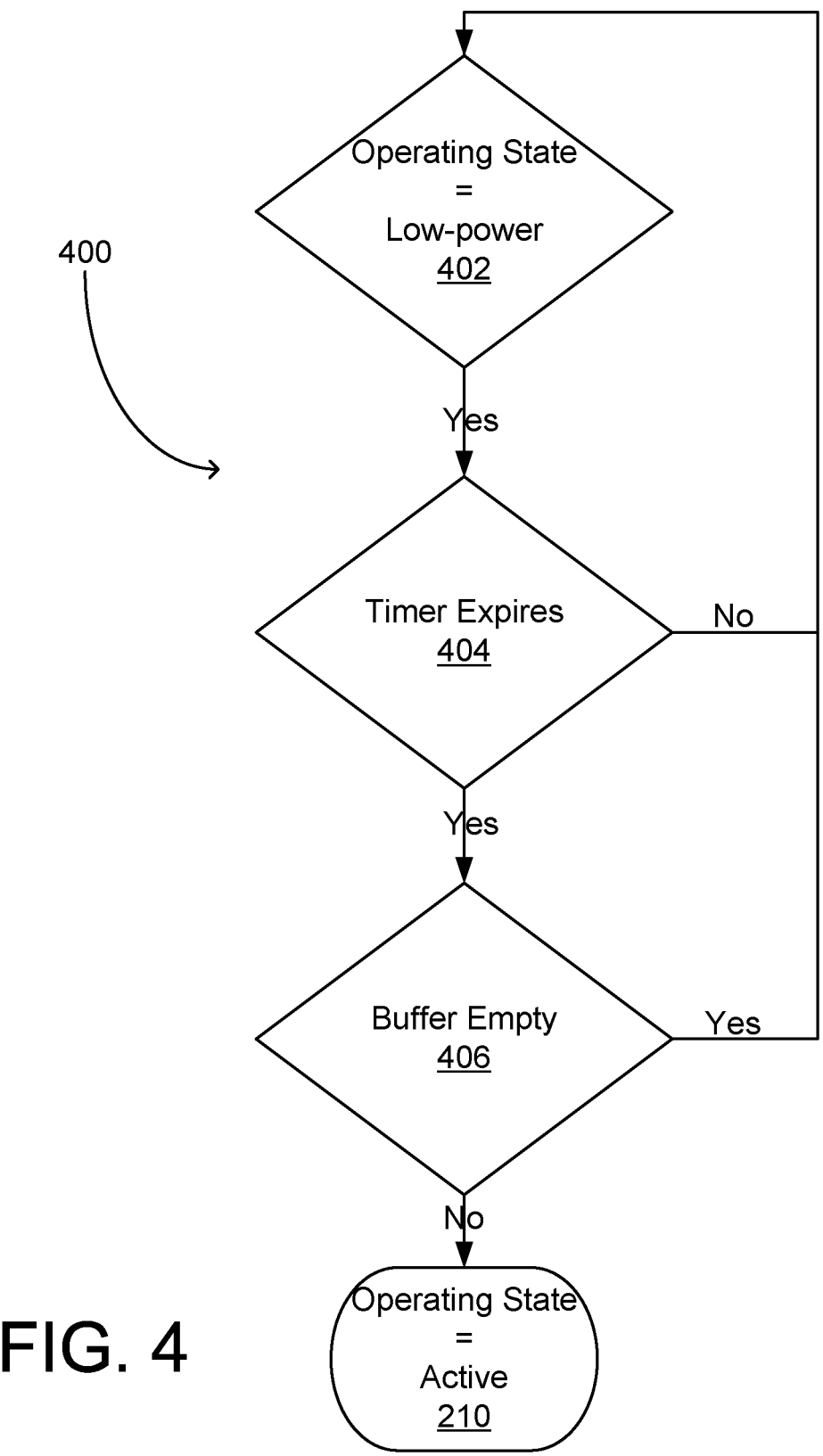
FIG. 4 is a flowchart of an algorithm according to another example embodiment.

FIG. 4 is a flowchart of an algorithm 400 according to another example embodiment. In this example, the port processor 104 may perform the algorithm 400 if the port 102 is in the low-power state (402). The port processor 104 may determine whether a timer, such as the aging timer discussed above, has expired (404). If the timer has not expired, then the port processor 104 may allow the port to remain in the low-power state (402). If the timer has expired, then the port processor 104 may compare the buffer length to the timer expiration buffer threshold, and/or determine whether the port's 102 buffer is empty (406). If the buffer is empty, or if the buffer length is less than the timer expiration buffer threshold, then the port processor 104 may allow the port 102 to remain in the low-power state (402). If the buffer length is greater than, or greater than or equal to, the timer expiration buffer threshold, or if the port's buffer is not empty (is storing one or more packets), then the port processor 104 may place the port 102 in the active operating state (210).

Figure 5:
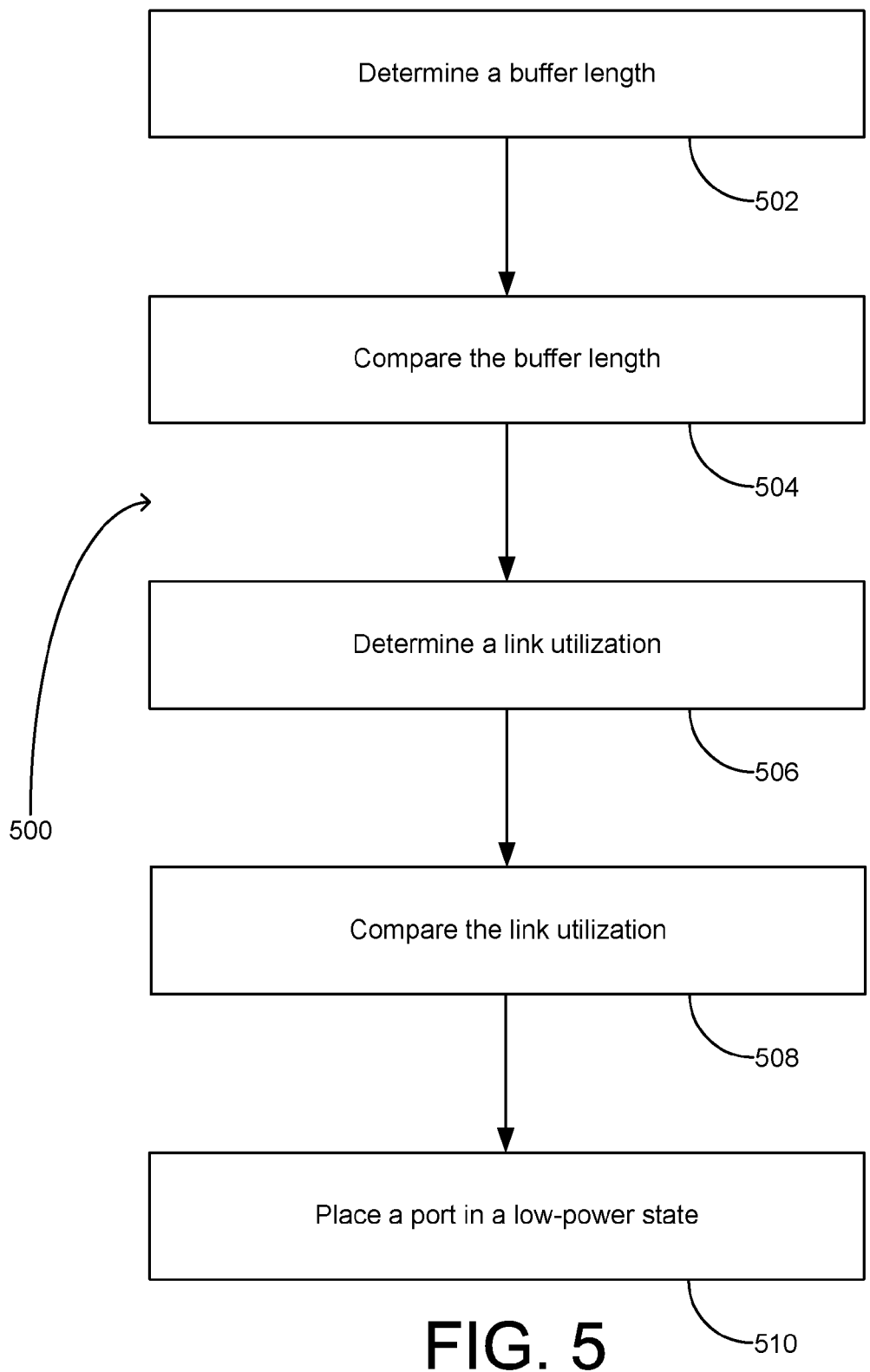
FIG. 5 is a flowchart of a method according to an example embodiment.

FIG. 5 is a flowchart of a method 500 according to an example embodiment. According to an example embodiment, the method 500 may include determining, by a port processor 104, a buffer length based on an amount of data stored for a port 102 controlled by the port processor 104 (502). The data (or packets) may be stored in the port 102 and/or in the memory management unit 106. The method 500 may also include comparing the buffer length to a low-power buffer threshold (504). The method 500 may also include determining a link utilization based on a number of packets transmitted by the port (506). The method 500 may also include comparing the link utilization to a link utilization threshold (508). The method 500 may also include placing the port 102 into a low-power state based on the comparison of the buffer length to the low-power buffer threshold and the comparison of the link utilization to the link utilization threshold (510).

According to an example embodiment, the determining the link utilization may include determining the link utilization based on the number of packets transmitted by the port over a link utilization time interval.

According to an example embodiment, placing the port 102 into the low power state may include placing the port 102 into the low power state based on the buffer length being less than the low-power buffer threshold and the link utilization being less than the link utilization threshold.

According to an example embodiment, the method 500 may further include the port 102 ceasing transmission of packets based on the port processor placing the port into the low-power state.

According to an example embodiment, the method 500 may further include removing the port from the low-power state based on an aging timer expiring, and comparing the buffer length to a timer expiration buffer threshold upon expiration of the aging timer.

According to an example embodiment, the method 500 may further include comparing the buffer length to an active buffer threshold, and removing the port 102 from the low-power state based on comparison of the buffer length to the active buffer threshold.

According to an example embodiment, the method 500 may further include comparing the buffer length to an active buffer threshold, and removing the port 102 from the low-power state based on the buffer length exceeding the active buffer threshold.

According to an example embodiment, the method 500 may further include the port 102 and/or the port processor 104 receiving the packets from a memory management unit 106.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising:
    a port processor, the port processor being configured to:
        compare a buffer length to a low-power buffer threshold, the buffer length being based on an amount of data stored for a port controlled by the port processor;
        place the port into a low-power state based on the comparison of the buffer length to the low-power buffer threshold; and
        when the port is in the low-power state:
            remove the port from the low-power state based on either of the following conditions:
                comparing the buffer length to a non-zero timer expiration buffer threshold upon expiration of an aging timer and while in the low-power state; and
                comparing the buffer length to an active buffer threshold before the expiration of the aging timer, the active buffer threshold being different than the timer expiration buffer threshold.

2. The apparatus of claim 1, wherein the placing the port into the low-power state includes placing the port into the low-power state based on the buffer length being less than the low-power buffer threshold.

3. The apparatus of claim 1, wherein the placing the port into the low-power state includes instructing the port to cease transmission of packets.

4. The apparatus of claim 1, wherein the timer expiration buffer threshold is less than the active buffer threshold.

5. The apparatus of claim 1, wherein the port processor is included in the port, the port being configured to receive packets from a memory management unit.

6. The apparatus of claim 1, wherein the apparatus operates according to an IEEE 802.3az Energy Efficient Ethernet (EEE) protocol.

7. The apparatus of claim 1, wherein the port processor is further configured to:
    compare a link utilization to a link utilization threshold, the link utilization being based on a number of packets transmitted by the port,
    wherein the placing the port into the low-power state includes placing the port into the low-power state based on the comparison of the buffer length to the low-power buffer threshold and the comparing the link utilization to the link utilization threshold.

8. The apparatus of claim 1, further comprising a memory management unit, the memory management unit being configured to determine whether to forward packets to the port.

9. An apparatus comprising:
    a port processor, the port processor being configured to:
        compare a link utilization to a link utilization threshold, the link utilization being based on a number of packets transmitted by a port controlled by the port processor;
        place the port into a low-power state based on the comparison of the link utilization to the link utilization threshold; and
        when the port is in the low-power state:

remove the port from the low-power state based on either of the following conditions:

comparing a buffer length to a non-zero timer expiration buffer threshold upon expiration of an aging timer and while in the low-power state, the buffer length being based on an amount of data stored for the port controlled by the port processor; and comparing the buffer length to an active buffer threshold before the expiration of the aging timer, the active buffer threshold being different than the timer expiration buffer threshold.

10. The apparatus of claim 9, wherein the placing the port into the low-power state includes placing the port into the low-power state based on the link utilization being less than the link utilization threshold.

11. The apparatus of claim 9, wherein the placing the port into the low-power state includes instructing the port to cease transmission of packets.

12. The apparatus of claim 9, wherein the timer expiration buffer threshold is less than the active buffer threshold.

13. The apparatus of claim 9, wherein the apparatus operates according to an IEEE 802.3az Energy Efficient Ethernet (EEE) protocol.

14. The apparatus of claim 9, wherein the port processor is further configured to:

compare a buffer length to a low-power buffer threshold, the buffer length being based on an amount of data stored for the port, wherein the placing the port into the low-power state includes placing the port into the low-power state based on the comparison of the buffer length to the low-power buffer threshold and the comparing the link utilization to the link utilization threshold.

15. A non-transitory computer-readable storage medium comprising instructions stored thereon that, when executed by a port processor, are configured to cause the port processor to at least:

compare a buffer length to a low-power buffer threshold, the buffer length being based on an amount of data stored for a port controlled by the port processor;

place the port into a low-power state based on the comparison of the buffer length to the low-power buffer threshold; and when the port is in the low-power state:

remove the port from the low-power state based on either of the following conditions:

comparing the buffer length to a non-zero timer expiration buffer threshold upon expiration of an aging timer and while in the low-power state; and comparing the buffer length to an active buffer threshold before the expiration of the aging timer, the active buffer threshold being different than the timer expiration buffer threshold.

16. The storage medium of claim 15, wherein the placing the port into the low-power state includes placing the port into the low-power state based on the buffer length being less than the low-power buffer threshold.

17. The storage medium of claim 15, wherein the placing the port into the low-power state includes instructing the port to cease transmission of packets.

18. The storage medium of claim 15, wherein the timer expiration buffer threshold is less than the active buffer threshold.

19. The storage medium of claim 15, wherein the port processor operates according to an IEEE 802.3az Energy Efficient Ethernet (EEE) protocol.

20. The storage medium of claim 15, wherein the port processor is further configured to:

compare a link utilization to a link utilization threshold, the link utilization being based on a number of packets transmitted by the port, wherein the placing the port into the low-power state includes placing the port into the low-power state based on the comparing the buffer length to the low-power buffer threshold and the comparing the link utilization to the link utilization threshold.

* * * * *